Patented May 19, 1936

2,041,129

UNITED STATES PATENT OFFICE 2,041,129

MANUFACTURE OF CEREAL PRODUCTS

Charles Hoffman, Crestwood, N. Y., assignor to Ward Baking Company, New York, N. Y., a corporation of New York No Drawing. Application November 12, 1932, Serial No. 642,457

4 Claims. (Cl. 99—83)

This invention relates to an improved, stable, edible product manufactured from certain portions of cereal grains, particularly wheat germ preferably, though not necessarily, together with cereal cellulose, which product has an agreeable taste and is rich in vitamins, especially vitamin B. Another phase of the invention resides in the provision of an improved process for incorporating into a superior edible product desirable portions of such materials as wheat germ, cereal cellulose and the like. The process which I have developed for this purpose is simple, economical, and very effective. It enables the addition of constituents rich in vitamin B and valuable mineral salts as well as desirable forms of roughage to various food products now available without materially adding to the cost of these products and in such a way as to impart an agreeable taste to the product. Other more specific features of the invention will be apparent from the following detailed disclosure of the nature of the invention and how it may be practiced.

According to one embodiment of my invention, a product of the character contemplated may be made by mixing wheat germ, preferably in the form in which it is produced in the flour milling industry, with ingredients capable of producing a dough-like mass, scaling the mass into suitable receptacles, allowing time for the desired rising if a leavening agent is employed, baking the dough-like material at a moderately low temperature, drying the baked material in some convenient manner, and grinding the material to a suitable fineness.

By way of a specific example illustrating the invention, the following ingredients may be thoroughly mixed:

| | Parts |
|---|---|
| Wheat germ | 400 |
| Flour (preferably Red Dog or second clears) | 400 |
| Malt extract (diastatic) | 75 |
| Molasses | 75 |
| Cereal cellulose (rice hulls) | 90 |
| Salt | 20 |
| Yeast (compressed) | 30 |
| Yeast—dry—(brewer's or distiller's) | 50 |
| Water | 600 |

The resulting mass may be allowed to stand in a warm space, at normal room temperature or preferably slightly above, for two hours, more or less, depending upon the amount of yeast employed, and then be scaled into pans, such as those commonly employed for making bread, in layers of suitable thickness and allowed to rise for about half to three quarters of an hour or until the pans are about two-thirds full. The dough-like mass in the pans is thereafter placed in an oven and subjected to a temperature of about 325°–350° F. for approximately 40 minutes. Or it may be baked in a suitable chamber with steam under a pressure. The time of bake depends upon the pressure used. If using 3 to 5 pounds pressure, 45 minutes is sufficient bake. The baked material may now be allowed to cool sufficiently, and may then be sliced, dried in the air, or by heat, or both, dry heat being preferred, and finally ground to a suitable fineness, for instance, such that most of the particles will pass a forty-mesh screen. Preferably the material may be toasted to a desired extent, during the drying or, if preferred, after being ground, thus improving the flavor and keeping qualities of the product. Care should be taken to avoid excessive toasting in order not to destroy the vitamins.

While the process employed and the ingredients of the composition have been stated in considerable detail in the specific example, it will be understood that many variations, in the nature of the ingredients and the proportions used, are possible within the scope of the invention. For instance, the leavening agent, such as compressed yeast, may be omitted altogether in certain cases or a baking powder or the like may be employed in place of the yeast. In such cases, the preliminary rising of the dough in the pans may be eliminated and the dough may be immediately baked after scaling. If baking powder is used in lieu of or in addition to yeast it may be added in such quantities as are customary in the making of biscuits, for example, 50 parts in lieu of the compressed yeast in the specific mixture mentioned. The amount of cereal cellulose may be varied considerably; it may, in fact, be omitted altogether, if desired, or it may be used in relatively large quantities. While rice hulls are preferred, other types of edible cellulose may be used.

Such cellulose provides roughage and appears to be particularly advantageous when combined in a ground, baked product in the manner described. When incorporated in a food product by this method, a greater quantity may be added than can be added directly without imparting objectionable characteristics to the food. The other ingredients such as the flour, malt, molasses and salt, may be varied in character and/or percentage and some of them may even be omitted or replaced by other substances. It may further be noted that while the present process makes possible the employment of the complete raw wheat germ to advantage, the defatted germ or germ from which oil may have been removed, can likewise be used. While dry, brewer's or distiller's yeast is advantageous as aiding in building up the vitamin G content of the finished product, this ingredient may, if desired, be dispensed with.

If desired, in place of all or part of the wheat flour, soya bean flour, weight for weight, may be employed. Soya bean flour has the advantage, for certain purposes, of being rich in protein matter and low in starches.

The employment of diastatic malt extract, or other diastatic product such as dry malt, appears not only to have a favorable solubilizing effect upon the starches, especially during the baking, but also to aid in producing a product having improved flavor and good physical characteristics. While the invention is not to be restricted to any particular theory of operation, it is probable that the malt exerts a bio-chemical action on the starch in the course of baking, converting a small portion of it to sugars. However, by far the major portion of the starch is preferably not so converted.

The finished product has been found to have a particularly rich and agreeable flavor and to have excellent nutritive value, being rich in vitamins B, E and G, as well as in mineral salts, such as those of iron, manganese and copper. When soya bean flour is employed the product has a distinctive, fine flavor and also contains vitamin A. The improved product of the present invention will ordinarily be utilized in suitable combination or intermixture with other food products, as will be more fully explained hereinafter. In this connection, it may be noted that a rather extraordinary result is produced in that the vitamins and other valuable constituents may be present in the ultimate intermixture or product in quantities estimated at from 10 to 15 times the amounts ordinarily present in a corresponding weight of a whole cereal product of the same general sort without imparting any objectionable taste to the product by the presence of the germ ingredients. In other words, not only is the nutritive value of a food product improved by the addition of the product of my new process, but at the same time the flavor is actually and surprisingly superior to that of the product prior to such addition.

Through the present invention, not only may wheat germ, ordinarily considered substantially unusable as a food product, be employed to advantage, but the improved process makes it possible to eliminate preliminary purification of the germ to remove oil and the like, thus permitting full utilization of the ingredients of the germ and at the same time effecting an economy. Furthermore, objectionable taste in the product, due to the presence of the germ, is completely avoided and, in fact, an improved flavor is imparted to the product. Moreover, the product is not subject to becoming rancid or to deterioration upon standing over normal periods of time involved in marketing. In other words, through my present process, the oils in the germ do not need to be extracted and the resulting product has remarkably good flavor, nutritive value and stability.

The product formed according to the invention is particularly advantageous for mixing with other finely divided materials and on account of its properties is useful for a great number of different food products. For instance, when ground to the proper fineness it can be used in a mixture with one or more granular or shredded corn, rice, oat and wheat products made from grain endosperm such as many of those on the market at the present time or it may be added to the grain endosperm mixture from which the flaked breakfast foods are made. My new product can also be used in chocolate preparations, ice cream, puddings, prepared flours and so forth. The proportions of the ingredients in such products will vary depending upon the characteristics desired. However, satisfactory results may be secured by employing, for instance, one part of my improved vitamin product, produced in accordance with the particular example cited, in combination with two parts of one or more of the following: ground to pass a twenty mesh sieve: wheat endosperm, corn meal, polished rice, or hulled oats. In this way, a particularly excellent, balanced, nutritive combination with improved flavor may be provided.

Moreover, the product formed in accordance with the invention, when ground to a rough granulation, is by itself an excellent cereal breakfast food, particularly after it is toasted. It may be served and eaten without any additional cooking. In other words, the present product constitutes a prepared cereal food having a fine flavor and a very high content of the vitamins B, E and G, as well as valuable mineral salts. For such direct use, the proportions of the various ingredients used in preparing the composition will preferably be varied somewhat from those given in the illustrative example. The wheat germ may in this case advantageously constitute about 20 to 25 per cent of the mixture, the cereal cellulose about 7 to 10 percent, and the flour about 55 to 70 percent.

The novel product containing concentrated vitamins may be employed in a milk drink, for which purpose it is preferably pulverized to pass a 100 to 150 mesh sieve and then mixed with dry milk and sugar. For instance, 15 parts each of cocoa and milk powder may be mixed with 30 parts of my improved product and 50 parts of powdered sugar. However, this formula is merely suggestive and may be varied according to taste. For instance, the product has a pleasant taste when mixed with milk alone, or with sweetened milk.

While a number of uses have been suggested for my improved product, the invention in its broadest aspects is not restricted to any particular use.

The terms and expressions which have been employed are used as terms of description and not of limitation, and there is no intention, in the use of such terms and expressions, of limiting any equivalents of the features shown and described, or portions thereof, but it is recognized that various modifications are possible within the scope of the invention claimed.

I claim:

1. Method of preparing an edible, stable product rich in vitamins which comprises mixing entire wheat germ with ingredients including a leavening agent capable of forming a dough, the wheat germ being in excess of 20% of the dry ingredients of the mixture, baking the dough after allowing the same to rise, for from one-half to three-quarters of an hour at substantially room temperature, drying the baked material, and reducing the same to a finely divided condition.

2. Method of preparing an edible product which comprises mixing entire wheat germ with ingredients including a baking powder capable of forming a dough, the wheat germ being in excess of 20% of the dry ingredients of the mixture, baking the raw dough, drying the baked material, and reducing the same to a finely divided condition.

3. As a new article of manufacture, a stable finely divided baked and dried product rich in vitamins containing more than 20% of substantially entire wheat germ intimately intermixed with ingredients capable of forming a dough-like mass.

4. As a new article of manufacture a stable, edible composition having more than ten times the vitamin content of whole grain comprising a mixture of a finely divided, prepared grain endosperm, and a finely divided, baked product containing more than 20% of substantially entire wheat germ and ingredients capable of forming a dough-like mass.

CHARLES HOFFMAN.